United States Patent [19] [11] 4,319,465
Ito et al. [45] Mar. 16, 1982

[54] CONSTANT VELOCITY JOINT

[75] Inventors: Akihiko Ito; Noriaki Saeki, both of Iwata, Japan

[73] Assignee: NTN Toyo Bearing Company, Ltd., Osaka, Japan

[21] Appl. No.: 98,942

[22] Filed: Nov. 30, 1979

[30] Foreign Application Priority Data

Dec. 4, 1978 [JP] Japan .............................. 53-150207

[51] Int. Cl.³ ............................................... F16D 3/34
[52] U.S. Cl. .............................................. 64/21; 64/7
[58] Field of Search ........................................ 64/21, 7

[56] References Cited

U.S. PATENT DOCUMENTS

| | | | |
|---|---|---|---|
| 3,324,682 | 6/1967 | Bendler | 64/21 |
| 3,475,924 | 11/1969 | Aucktor | 64/21 |
| 3,789,624 | 2/1974 | Camosso | 64/21 |
| 4,019,347 | 4/1977 | Krude | 64/21 |
| 4,090,375 | 5/1978 | Takahashi et al. | 64/21 |
| 4,156,353 | 5/1979 | Welschof | 64/21 |
| 4,231,232 | 11/1980 | Otsuka et al. | 64/21 |

Primary Examiner—Ira S. Lazarus

[57] ABSTRACT

A constant velocity joint for connecting two revolving shafts with each other and transmitting rotary motion from one to the other comprising an inner joint member and an outer joint member associated with the two shafts respectively, a plurality of ball elements interposed between the inner and outer members for transmitting torque from one to the other, and a cage member arranged between the inner and outer members for holding the ball elements in position, wherein one or both of the inner and outer joint members, e.g. the inner member, is provided in the peripheral surface thereof with a plurality of ball receiving grooves, each of which extends in the direction of axis of the inner member and gradually deepens in its longitudinal direction toward one end of the inner member, each of opposing side walls of the ball groove being formed therein a recessed portion ranging from substantially the center of the joint to one end of the inner member toward which the ball groove deepen so that the depth of the ball groove that is to be subjected to grinding operation is substantially constant along the longitudinal direction thereof, thereby reducing the area to be ground and thus production cost for the constant velocity joint.

5 Claims, 11 Drawing Figures

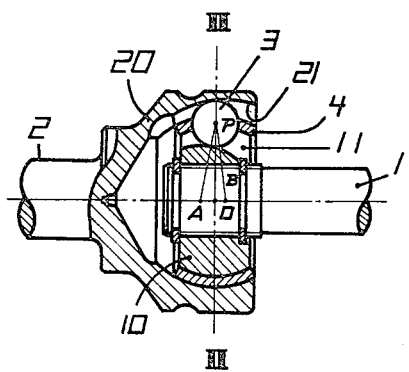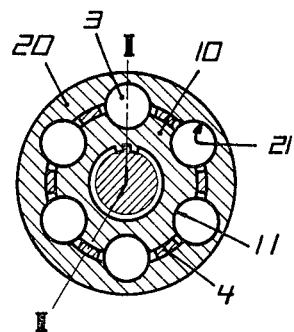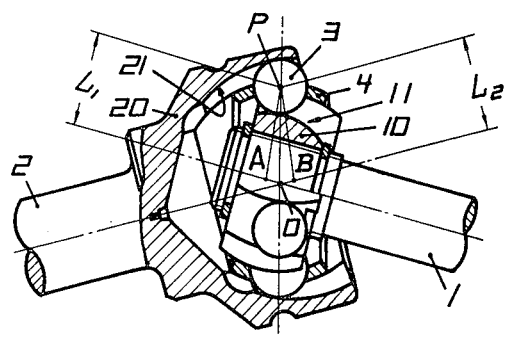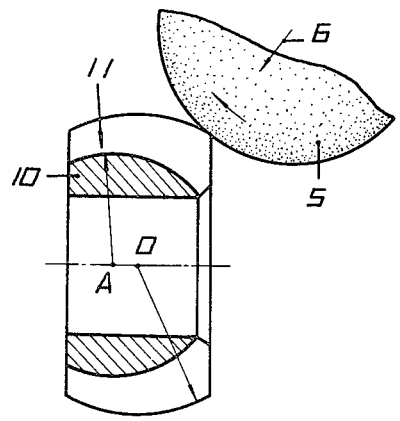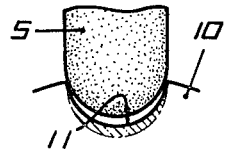

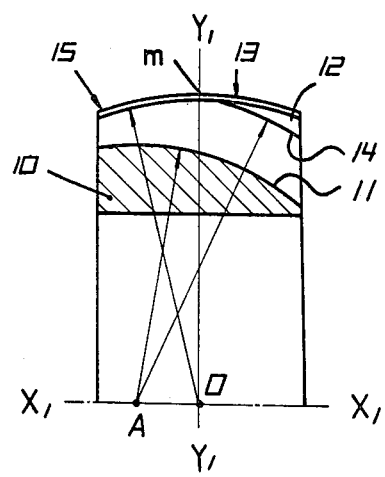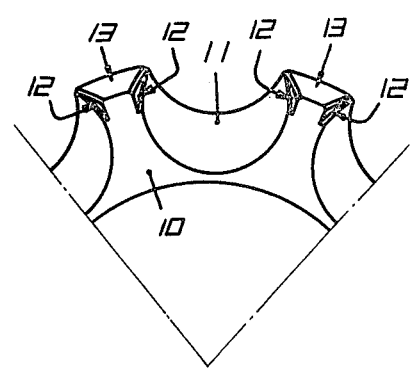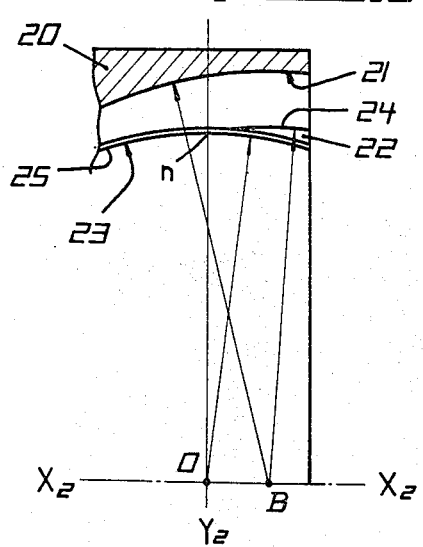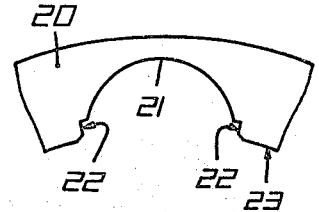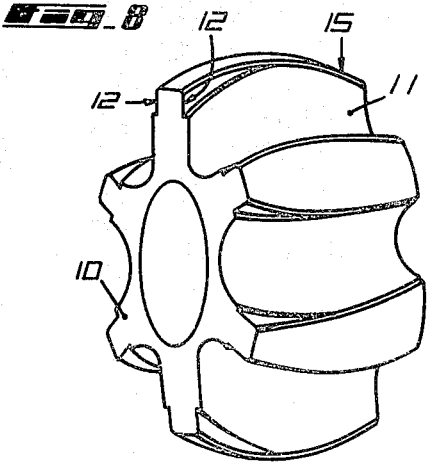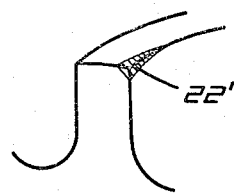

CONSTANT VELOCITY JOINT

This invention relates to a constant velocity joint for use with power transmission shafts of automobiles and the like.

One object of this invention is to provide a constant velocity joint with inner and outer joint members in which increased grinding capability for the formation of ball receiving grooves and thus reduction of production cost are ensured without adverse effect to load capacity in torque transmission; which is achieved in accordance with the present invention by forming relief portions or recesses for the purpose of dispensing with grinding work, i.e. non-ground portions, within some fixed regions of the respective ball grooves of the inner and outer members to such extent in which no decline of load capacity for torque transmission is caused.

The present invention provides a constant velocity joint which comprises an outer joint member having a plurality of ball grooves formed in the inner spherical surface thereof and deepening in one direction of the axis of the outer joint member, an inner joint member provided in the outer spherical surface thereof with ball grooves in the same number as those in the outer member, torque transmitting ball elements arranged in the respective ball grooves in the joint members, and a cage member guided through the spherical surfaces of both the joint members for holding the torque transmitting ball elements in position, wherein each of the ball grooves in at least one of the joint members which cooperate with each other for keeping the torque transmitting balls held in position in a plane bisecting an angle formed by the axes of the inner and outer members, gradually deepens in its longitudinal direction, and wherein relief portions or recesses are provided on opposing side walls of each ball groove so that the ball grooves are to be of substantially constant depth throughout the length thereof.

These and other objects and features of the present invention will become more apparent from the following description with reference to the accompanying drawings, in which:

FIG. 1 is a sectional view taken along the line I—I in FIG. 2 and illustrates a constant velocity joint according to the invention, with the two shafts in alignment;

FIG. 2 is a sectional view taken along the line II—II in FIG. 1;

FIG. 3 is a sectional view similar to FIG. 1, with the two shafts non-aligned;

FIGS. 4 and 5 are views illustrating schematically a manner to grind ball grooves in an inner joint member;

FIG. 6 is a sectional view in part of an inner joint member according to the invention;

FIG. 7 is an end view of the inner joint member shown in FIG. 6;

FIG. 8 is a perspective view of the inner member shown in FIG. 6;

FIG. 9 is a sectional view in part of an outer joint member according to the invention;

FIG. 10 is an end view of the outer joint member shown in FIG. 9; and

FIG. 11 is a perspective view illustrating another way of forming a relief portion.

Referring first to FIGS. 1 and 2, a constant velocity joint of the type to which the present invention is directed comprises an inner joint member 10 and an outer joint member 20 associated with shafts 1 and 2 to be connected with each other, respectively, as well as a plurality of torque transmitting balls 3 interposed between the inner and outer members through a cage member 4. The balls 3 are individually fitted into grooves 11 and 21 formed at equal intervals in both the outer surface of the inner member 10 and the inner surface of the outer member 20. Whereas the outer surface of inner member 10 and the inner surface of the outer member 20 are formed as parts concentric about the center O of the joint, ball grooves 11 of the inner member 10 and those 21 of the outer member 20 have arcuate bottom lines whose centers of curvature are located at points A and B, respectively as shown in FIG. 1, the points A and B being located on opposite sides of and spaced by the same distance from the center O of the joint. In other words, the ball groove is so designed that a locus of the center P of the ball 3 which rolls in the ball groove draws a continuous curve whose centers of curvature lie on the points A and B, to thereby ensure that the ball 3 is always kept in an imaginary plane bisecting an angle formed between the two shafts 1 and 2 and that the same angular velocity on the two shafts being connected is available even when non-aligned.

That is to say, a necessary and satisfactory condition for ensuring the same angular velocity on the two shafts connected by the joint of this kind is such that the balls 3 for torque transmission are positioned in a plane bisecting an angle formed between the two shafts. Assuming that the two shafts 1 and 2 form therebetween an angle as shown in FIG. 3, the joint forms an angle between the inner and outer joint members around the center O of spherical surfaces of these members under mutual guiding action between the inner spherical surface of the outer member 20 and the outer spherical surface of the cage member 4 as well as between the inner spherical surface of the cage member and the outer spherical surface of the inner member, whereupon the balls 3 shift to positions in a plane bisecting an angle formed between the two shafts 1 and 2 while guided within the ball grooves 11 and 21 of the inner and outer members 10 and 20, respectively, the centers of curvature of the arcuate bottom lines of the ball grooves being spaced from the point O. In addition to the determining of the angle center of the joint, the cage member 4 is supported between the inner spherical surface of the outer member 20 and the outer spherical surface of the inner member 10, and bears a force which acts upon and tends to drive the balls 3 out of the ball grooves 11 and 21 to keep positions of the balls 3 as required. A distance from the angle center O of the joint to the center B of the ball grooves 21 in the outer member 20 is designed to be equal to that from the angle center O to the center A of the ball grooves 11 in the inner member. This means that distances from the center P of the ball 3 to A and B respectively are equal to each other and, therefore, $\triangle OAP$ is congruent with $\triangle OBP$ because of equal lengths of the respective three sides, leading to equality in distances $L_1$ and $L_2$ from the center P of the ball 3 to the axes of the shafts 1 and 2. As a result, the balls 3 are positioned in a plane bisecting an angle formed between the shafts 1 and 2, thus ensuring the constant angular velocity on the two shafts.

Then, the ball grooves in the inner and outer joint members are to be ground to the finished shape with high precision by means of a grinding wheel. In spite of such requirement, since the center of curvature of the ball grooves is out of coincidence with that of the outer surface of the inner member or the inner surface of the outer member, i.e. that of the cage guiding surface, the depth of the grooves varies along the direction of the joint axis, and the time required for the whole grinding operation is dominated by that required during the grinding of the deepest portion of the ball groove. This results in inefficient grinding effect and high production cost which have been long-lasting problems in the field. For example, inner joint member 10 is ground by a grinding wheel 5 while being rotated around the curvature center A of the ball grooves 11, as shown in FIG. 4, according to the conventional methods. The grinding wheel 5 is, as shown in FIG. 5, in the cross-sectional shape corresponding to that of a ball groove to be finished, and fed in the direction toward the center A of the inner member 10 as indicated by the arrow 6. The grinding wheel 5 starts grinding at the shoulder portions of the side walls on the deeper side of the ball groove 11 and is fed toward the bottom of the groove. The time required for grinding the deepest portion of the groove is, therefore, dominative over the entire time for grinding operation, causing the grinding operation to be time-consuming. Furthermore, since the surface of the groove is in use in contact with the ball for transmitting torque and requires a high precision, speeding up in feed rate of the grinding wheel is unavoidably limited; otherwise defects such as grinding cracks etc. occur in the groove surface. Accordingly, consumption of much time for grinding process becomes inevitable according to the conventional methods, causing rise of production cost as well.

Description in detail of an embodiment of the present invention eliminating aforesaid previous problems is as follows:

FIGS. 6 and 7 show an inner joint member 10 of the invention wherein relief portions or recesses 12 are formed in the opposing side walls of each ball groove 11 beneath the outer spherical surface of the inner member 10. Each of the relief portions or recesses 12 is, in particular, formed in such region which is bounded by the outer cage-guiding surface 13 of the inner member and the curved line 14. These relief portions or recesses 12 are formed quite independently of the chamfers 15 which are conventionally provided. As seen best from FIG. 6, the abovesaid curved line 14 is an arc whose center lies on the point A as a center of curvature which is common to the arcuate bottom line of the ball groove 11 in the inner member and passes through a point m at which the plane $Y_1$—$Y_1$ including the center O of the joint and perpendicular to the axis $X_1$—$X_1$ of the inner member intersects the cage guiding surface 13.

The above-described relief portions or recesses 12 are to be formed in the process prior to the grinding of the ball grooves, for example, forging or cutting operation such as milling. In short, the relief portions or recesses 12 are provided in the opposing side walls of the ball grooves 11 so that the depth of the groove portions which are to be subject to a later grinding operation is substantially constant over the region from substantially the center O of the joint to one end of the inner member toward which the grooves are gradually deepened. The inner member 10 made in such a way is shown in FIG. 8.

The presence of the relief portions or recesses 12 referred to above reduces a zone to be ground to such an area which terminates from the curved line 14 to the groove bottom, resulting in substantial shortening of work time required for grinding operation, increased work capacity or work efficiency, and lesser production cost. Further, load capacity for torque transmission can be maintained at the rate obtained on the plane $Y_1$—$Y_1$ and serves satisfactorily for practical use.

FIGS. 9 and 10 show an example in case of the outer joint member in which similar relief portions or recesses 22 are formed in the opposing side walls of each ball groove 21 in the outer member 20. Particularly, each of the relief portions 22 is formed in the opposing side walls of the ball grooves beneath the inner spherical surface of the outer member within the range bounded by the cage guiding surface 23 and the curved line 24.

As seen best from FIG. 9, the abovesaid curved line 24 is an arc whose center lies on the center B of the arcuate bottom line of the groove 21 in the outer member 20, and passes through a point n at which a plane $Y_2$—$Y_2$ including the curvature center of the cage guiding surface 23, i.e. the center O of the joint, and perpendicular to the axis $X_2$—$X_2$ of the outer member intersects the cage guiding surface 23. The manner to form the relief portions 22 in the outer member is substantially as described previously with respect to the inner member.

It should be noted that the way of forming such relief portion is not limited to that as shown in the drawings and described hereinbefore by way of example only, but other equivalent ways such as, for example, cutting of the hatched portion 22' in a slantwise direction as shown in FIG. 11, may be available. In addition, the recessed relief portion may be of any degree or depth, but may be more advantageous in case of shallower one.

What we claim is:

1. A constant velocity joint comprising an outer joint member having a plurality of axially extending grooves formed in an inner spherical surface thereof, an inner joint member provided with axially extending grooves in an outer spherical surface thereof in the same number as those in the outer member, a plurality of torque transmitting ball elements accommodated within the respective grooves in the outer and inner members, and a cage member guided between the spherical surfaces of the outer and inner members for holding the torque transmitting ball elements in position, wherein said ball receiving grooves which cooperate with each other on the cooperating outer and inner members for keeping the ball elements in a plane bisecting an angle formed between the axes of the outer and inner joint members, gradually deepen in longitudinal direction thereof, and wherein each groove of at least one of said inner joint member and outer joint member comprises a constant depth portion and relief portions, said constant depth portion having side walls, said relief portions extending radially from said side walls to said spherical surface of said joint member, said relief portions extending circumferentially outwardly of said groove.

2. A constant velocity joint as set forth in claim 1, wherein said relief portions axially extend from substantially the center of the joint to one end of the member toward which said grooves gradually deepen.

3. A constant velocity joint as set forth in one of claims 1 or 2, wherein said relief portions are provided in said inner joint member only.

4. A constant velocity joint as set forth in one of claims 1 or 2, wherein said relief portions are provided in said outer joint member only.

5. A constant velocity joint as set forth in any one of claims 1 or 2, wherein said relief portions are provided in both of said outer and inner joint members.

* * * * *